(12) United States Patent
Okabe

(10) Patent No.: US 9,013,735 B2
(45) Date of Patent: Apr. 21, 2015

(54) IMAGE FORMING SYSTEM AND IMAGE FORMING METHOD PROVIDING CONTROLS OF SETTINGS OF IMAGE POSITION AND RESTRICTION

(75) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 12/755,314

(22) Filed: Apr. 6, 2010

(65) Prior Publication Data

US 2010/0259773 A1 Oct. 14, 2010

(30) Foreign Application Priority Data

Apr. 10, 2009 (JP) ................................. 2009-096209

(51) Int. Cl.
*G06F 3/12* (2006.01)
*G03G 15/00* (2006.01)
*H04L 9/32* (2006.01)

(52) U.S. Cl.
CPC ........ *G03G 15/5091* (2013.01); *G03G 15/5087* (2013.01); *G06F 3/1208* (2013.01); *G06F 3/125* (2013.01); *G06F 3/1255* (2013.01); *G06F 3/1288* (2013.01)

(58) Field of Classification Search
None
See application file for complete search history.

(56) References Cited

U.S. PATENT DOCUMENTS

| 5,121,468 A * | 6/1992 | Daino ............................ 358/1.2 |
| 6,618,566 B2 * | 9/2003 | Kujirai et al. ................... 399/79 |
| 6,924,902 B2 * | 8/2005 | Murata ......................... 358/1.15 |
| 6,927,865 B1 * | 8/2005 | Kujirai et al. ................. 358/1.12 |
| 7,006,249 B2 * | 2/2006 | Matsuda ......................... 358/1.9 |
| 7,253,918 B2 * | 8/2007 | Nishide et al. ............... 358/1.15 |
| 7,586,641 B2 * | 9/2009 | Takaragi et al. ............... 358/1.9 |
| 8,503,006 B2 * | 8/2013 | Kondo ......................... 358/1.15 |
| 2002/0097431 A1 * | 7/2002 | Ikegami ....................... 358/1.15 |
| 2003/0182368 A1 * | 9/2003 | Horiyama ..................... 709/203 |
| 2004/0145973 A1 * | 7/2004 | Nagashima ................... 368/107 |
| 2004/0234169 A1 * | 11/2004 | Tojo .............................. 382/305 |
| 2005/0206953 A1 * | 9/2005 | Kujirai et al. ................ 358/1.15 |
| 2006/0023230 A1 * | 2/2006 | Nakata ........................... 358/1.6 |
| 2008/0304102 A1 * | 12/2008 | Saito ............................ 358/1.15 |
| 2009/0128849 A1 * | 5/2009 | Sakura ......................... 358/1.15 |

FOREIGN PATENT DOCUMENTS

| CN | 101315534 A | 12/2008 |
| JP | 2007-272632 A | 10/2007 |
| KR | 10-2003-0045033 A | 6/2003 |

* cited by examiner

*Primary Examiner* — Steven Kau

(74) *Attorney, Agent, or Firm* — Canon USA, Inc. IP Division

(57) ABSTRACT

A system includes a receiving unit configured to receive an operation input concerning an imposition setting, a generation unit configured to generate a first image in which images from a plurality of pages are virtually imposed in one page based on the imposition setting, and an output unit configured to output the first image regardless of a pre-set imposition setting restriction.

9 Claims, 15 Drawing Sheets

FIG.5

```xml
<?xml version="1.0" encoding="UTF-8" ?>
<ACT xmlns="http://www............
......
  <Version>01.01</Version>
  <SecurityInfo>
  ......
  </SecurityInfo>
  <UserInfo>
    <UserName>UserA</UserName>              ⎫
    <BaseRole>GeneralUser</BaseRole>        ⎬ 501
    ......                                   ⎪
  </UserInfo>                                ⎭
  ......
  <DeviceAccessControl>
    <AttributeCategory Name="Application" CategoryStatus="static">
      <saml:AttributeStatement>
        <saml:Attribute Name="ApplicationId">
          <saml:AttributeValue Name="UsePossible">aaaaaaaaaaaaa</saml:AttributeValue>
          <saml:AttributeValue Name="UsePossible">bbbbbbbbbbbb</saml:AttributeValue>
          <saml:AttributeValue Name="UseImpossible">cccccccccccccc</saml:AttributeValue>
          ......
        <saml:Attribute Name="ApplicationCategory">                                       ⎬ 502
          <saml:AttributeValue Name="PrintCategory">Permit</saml:AttributeValue>
          <saml:AttributeValue Name="CopyCategory">Permit</saml:AttributeValue>
          <saml:AttributeValue Name="SendCategory">Permit</saml:AttributeValue>
          ......
    </AttributeCategory>
    <AttributeCategory Name="DeviceCapability" CategoryStatus="static">
      <saml:AttributeStatement>
        <saml:Attribute Name="PdlPrint">
          <saml:AttributeValue Name="PdlPrintFlag">Permit</saml:AttributeValue>
          <saml:AttributeValue Name="ColorPrint">Color</saml:AttributeValue>
          <saml:AttributeValue Name="Simplex">Permit</saml:AttributeValue>
          <saml:AttributeValue Name="Nup">4</saml:AttributeValue>
          ......                                                                         ⎬ 503
        <saml:Attribute>
      </saml:AttributeStatement>
    </AttributeCategory>
    <AttributeCategory Name="Quota" CategoryStatus="Dynamic">
    ......
    </AttributeCategory>
  </DeviceAccessControl>
</ACT>
```

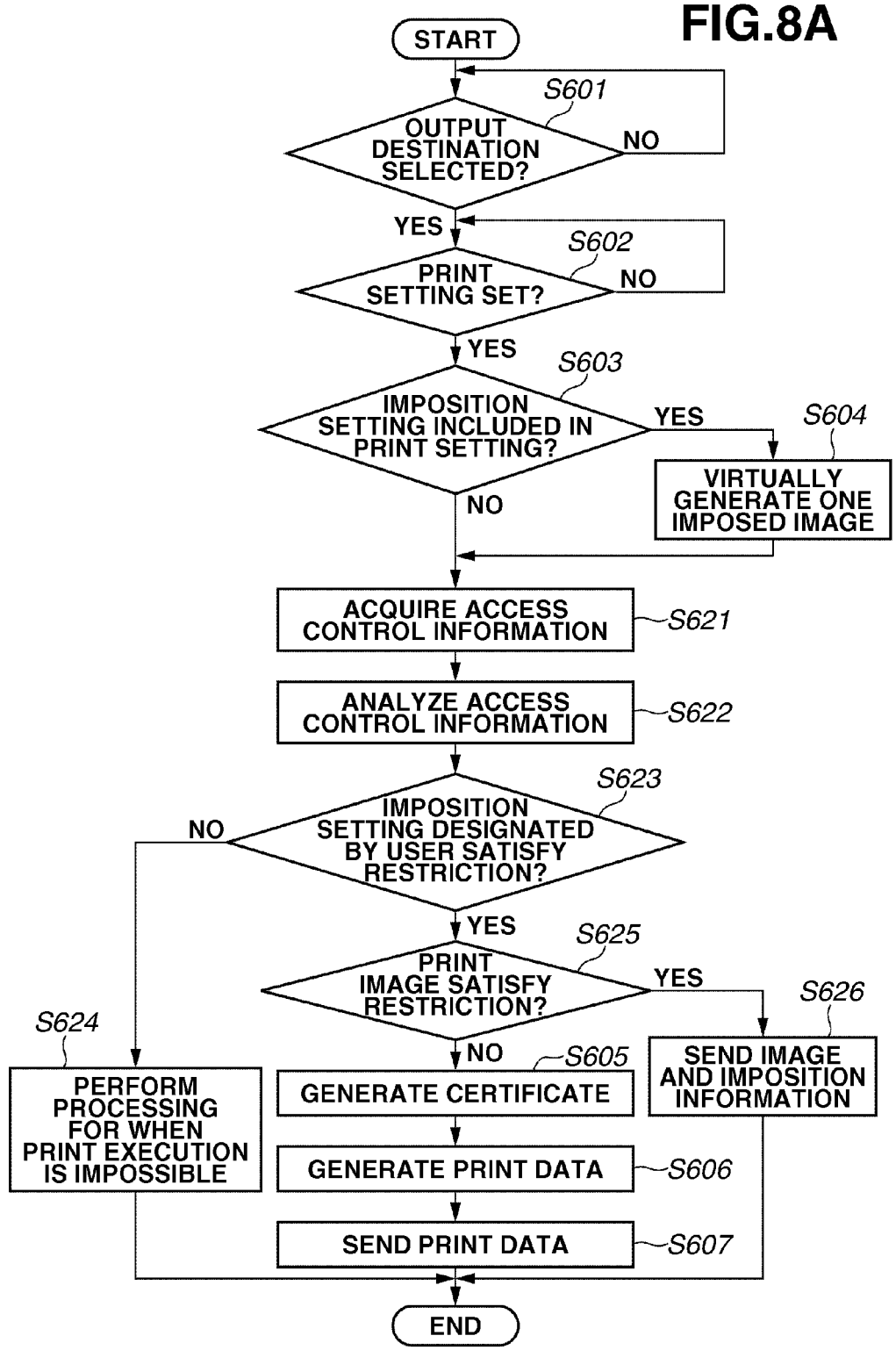

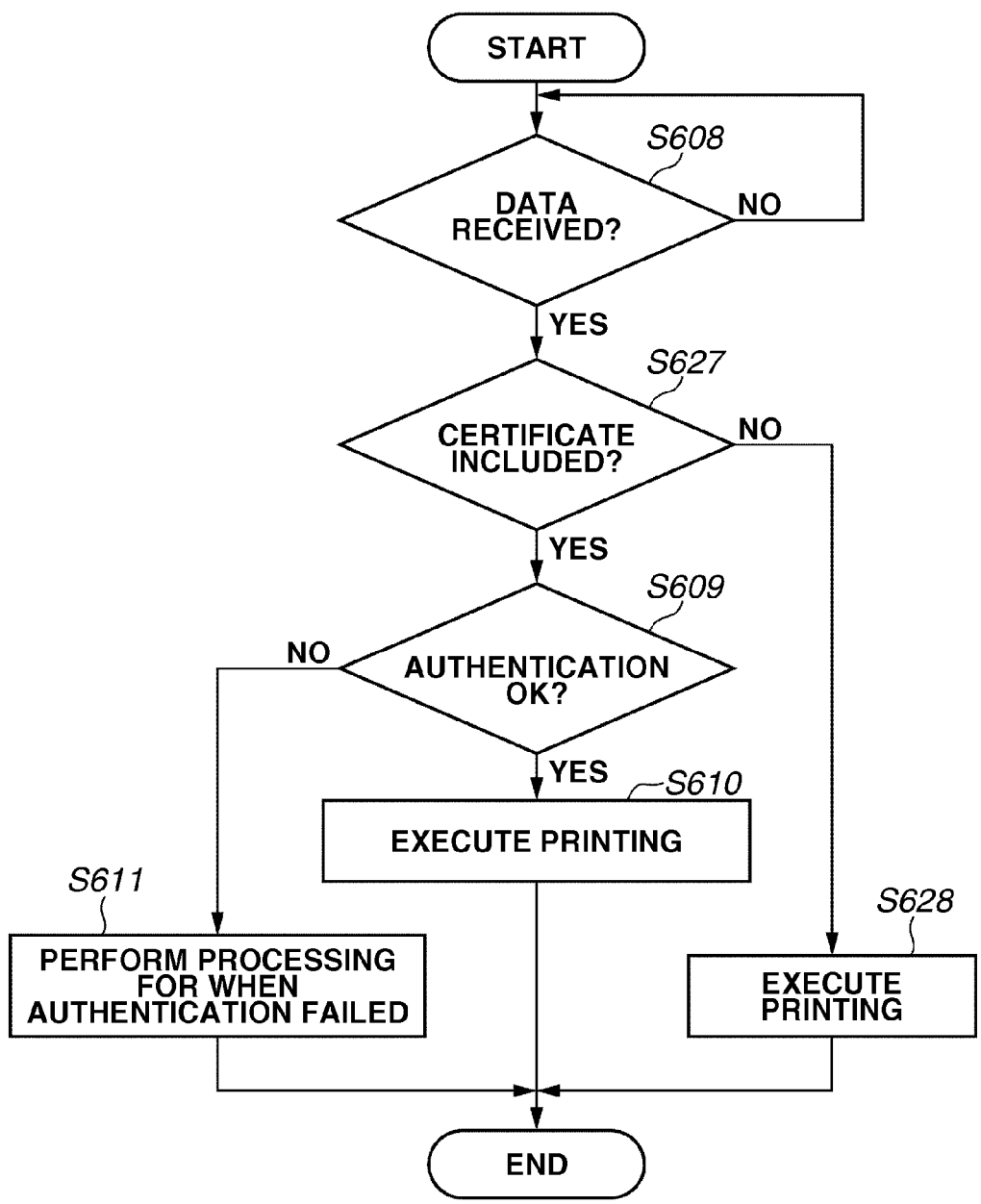

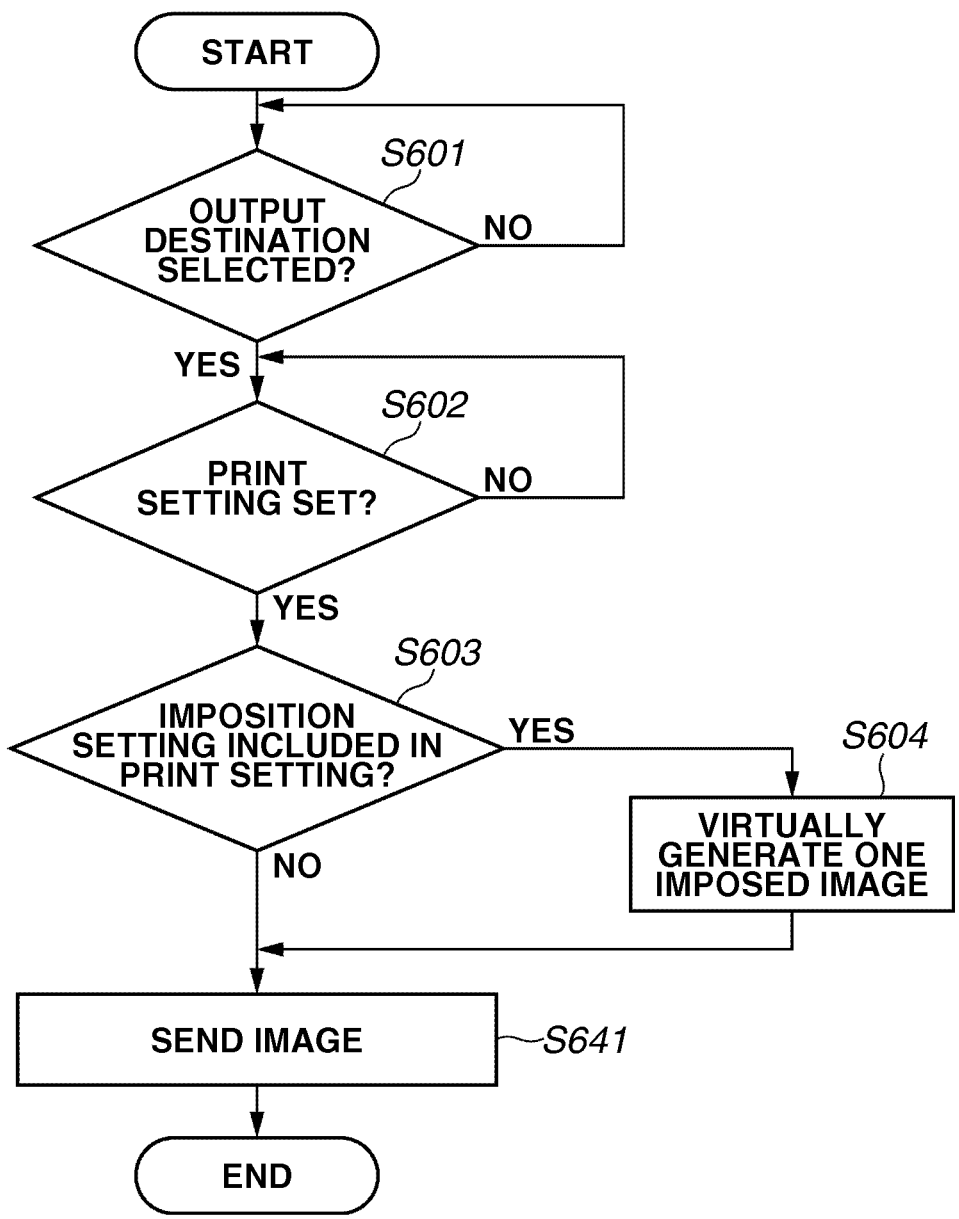

IMAGE FORMING SYSTEM AND IMAGE FORMING METHOD PROVIDING CONTROLS OF SETTINGS OF IMAGE POSITION AND RESTRICTION

BACKGROUND OF THE INVENTION

1. Field of the Invention

The present invention relates to an image forming system. More specifically, the present invention relates to a suitable system used for performing image imposition.

2. Description of the Related Art

Recently, the increasing multifunctionality of electrophotographic image forming apparatuses (e.g., copying machine, printer) has been remarkable. Further, there are also various functions relating to image forming apparatus output modes. An image forming apparatus can print in a format by using these functions based on an instruction from a user.

However, whether such functions are included in the image forming apparatus depends on each apparatus. Therefore, when the user instructs printing, a print setting such as imposition has to be performed while considering the functions of the output destination image forming apparatus. To resolve this situation, Japanese Patent Application Laid-Open No. 2007-272632 discusses a technique in which when the print setting set by the user is a setting that cannot be realized by the output destination image forming apparatus, first, an information processing apparatus acquires the functions of that image forming apparatus. Then, based on the acquired functions of the image forming apparatus, the information processing apparatus displays the print setting, which can be executed thereby and is as close as possible to the print setting set by the user.

On the other hand, from perspectives such as security and total cost of ownership (TCO), image forming apparatuses which restrict at least some functions on a per-user basis have become conspicuous. In such an image forming apparatus, first, several roles in which setting information is set on a per-function basis are prepared, and the user is assigned to a role. When the user logs in to the image forming apparatus, access control information based on the assigned role is issued, so that the various functions are utilized according to the function restrictions based on the access control information.

Further, as a function to be restricted, for example, an imposition setting can be restricted so that "printing is prohibited unless 2-in-1 or greater". Although image imposition processing is usually controlled by a printer driver, some applications can generate an aggregate image of N-in-1 (N being an integer of 2 or more) by themselves, and transfer that image as a 1-in-1 image to the printer driver.

In such a case, in the above-described environment in which an imposition setting is restricted, even though the user instructed 2-in-1 printing, the printer driver regards the data of the 2-in-1 aggregate image transferred from the application as a 1-in-1 image. Therefore, the printer driver converts the whole of the 2-in-1 aggregate image into a 2-in-1 image as data of one logical page. Consequently, printing cannot be performed correctly.

To overcome such a situation, there is a technique in which the user is identified, and based on the situation, an authority is flexibly raised. For example, Japanese Patent Application Laid-Open No. 2008-021245 discusses a technique in which, during printing, processing authority is given as an exception by attaching approval information (a signature) of an approver to the target data, and acquiring restriction information based on information about the approved user which is included in the approval information.

SUMMARY OF THE INVENTION

According to an aspect of the present invention, a system includes a receiving unit configured to receive an operation concerning an imposition setting, a generation unit configured to generate a first image in which images from a plurality of pages are virtually imposed in one page based on the imposition setting, and an output unit configured to output the first image regardless of a pre-set imposition setting restriction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of access control information according to an exemplary embodiment of the present invention.

FIG. 8A is a flowchart illustrating example processing by a client application performed during print processing according to an exemplary embodiment of the present invention.

FIG. 8B is a flowchart illustrating example processing performed by a printer driver during print processing according to an exemplary embodiment of the present invention.

FIG. 12A is a flowchart illustrating example processing performed by a client application during print processing according to an exemplary embodiment of the present invention.

DESCRIPTION OF THE EMBODIMENTS

Various exemplary embodiments, features, and aspects of the invention will be described in detail below with reference to the drawings.

In the above-described conventional example, attention is focused on the functions that the image forming apparatus has. Thus, when the usable functions are restricted on a per-user basis, the functions cannot be properly restricted.

Further, the conventional example has the following situations. First, an example will be considered in which, when an application generates an N-in-1 aggregate image, and transfers that aggregate image as a 1-in-1 image to the printer driver, an imposition restriction of "printing is prohibited unless 2-in-1 or greater" is imposed. In the conventional example, since a printing restriction is imposed based on approval information from an approver, this can result in 1-in-1 printing being possible if the user instructs printing with a 1-in-1 setting despite such a restriction being imposed.

Therefore, although a separate imposition setting restriction could be imposed, as described above, that would prevent printing from being correctly performed despite the fact that the user set the imposition setting within restriction. Further, the approver is to perform a signing operation for the data also. In addition, this also allows anybody to print this data when the data is used.

Therefore, the exemplary embodiments according to the present invention allow more reliable prevention than in the past of the situation in which an image is not output as intended by the user, even though the user set an imposition setting within restriction.

A first exemplary embodiment according to the present invention will now be described with reference to the drawings.

Figure 1:
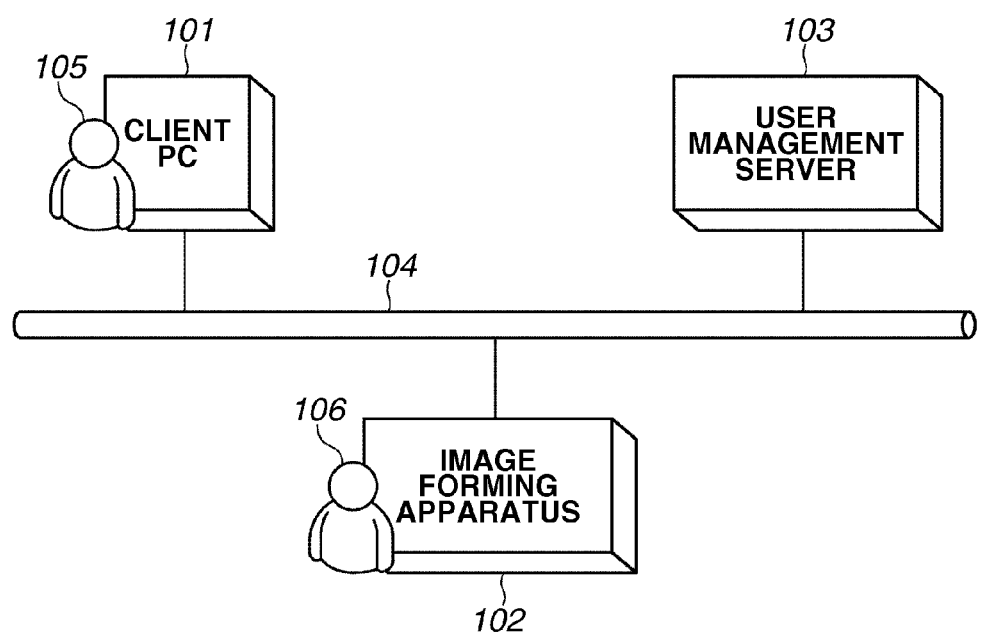
FIG. 1 illustrates an example of a configuration of a printing control system according to an exemplary embodiment of the present invention.

FIG. 1 illustrates an example of a printing control system configuration. A client PC 101 can execute various programs such as an application program. In the present exemplary embodiment, the client application program (hereinafter, abbreviated to "client application") and printer driver in the printing control system are located in the client PC 101.

The client PC 101 is connected to a network 104 such as the Internet. The client PC 101 sends print data, facsimiles, and the like to an image forming apparatus 102 via a printer driver and a facsimile driver, which convert document data into job data that can be interpreted by the image forming apparatus 102. The client application installed in the client PC 101 can generate a virtual N-in-1 (meaning that N logical pages are imposed in one physical page) aggregate image for printing.

A user 105 is a user who uses the image forming apparatus 102 by operating the client PC 101. A user 106 is a user who uses directly the image forming apparatus 102. The image forming apparatus 102 is a digital multifunction peripheral, for example. The image forming apparatus 102 has the function for restricting the function on a per-user basis, and stores information relating to the restriction. This information is referred to as "access control information".

The users 105 and 106 can use the functions of the image forming apparatus 102 based on the access control information. The access control information is usually set by a system administrator. Since the access control information can be set using a known technique, the details of such operation will be omitted here.

FIG. 5 illustrates an example of the access control information. The access control information contains information about who can use which functions on which image forming apparatus. Although FIG. 5 illustrates an example in which the access control information is described in eXtensible Markup Language (XML), the access control information can obviously be described using some other method.

In FIG. 5, a description 501 describes information about the user 105 who executed printing by a client application 401. A description 502 describes the applications and functions that can be used by the image forming apparatus 102. A description 503 describes in detail the access restrictions relating to the printing functions of the image forming apparatus 102 which can be accessed by the user 105.

A user management server 103 manages user information such as a user ID, a password, and the like. When the users 105 and 106 log in to the image forming apparatus 102 or the client PC 101, authentication is performed by the user management server 103. However, authentication may be managed by the client PC 101 or image forming apparatus 102 by themselves, without providing the user management server 103.

An example of a configuration in which the image forming apparatus 102 stores the access control information will now be described. However, the access control information may be stored on the user management server 103 or some other server, and the data may be synchronized with the image forming apparatus 102 at a given timing. Generally, when applying the same access control information to a plurality of image forming apparatuses, managing the information on a server may be more efficient.

Figure 2:
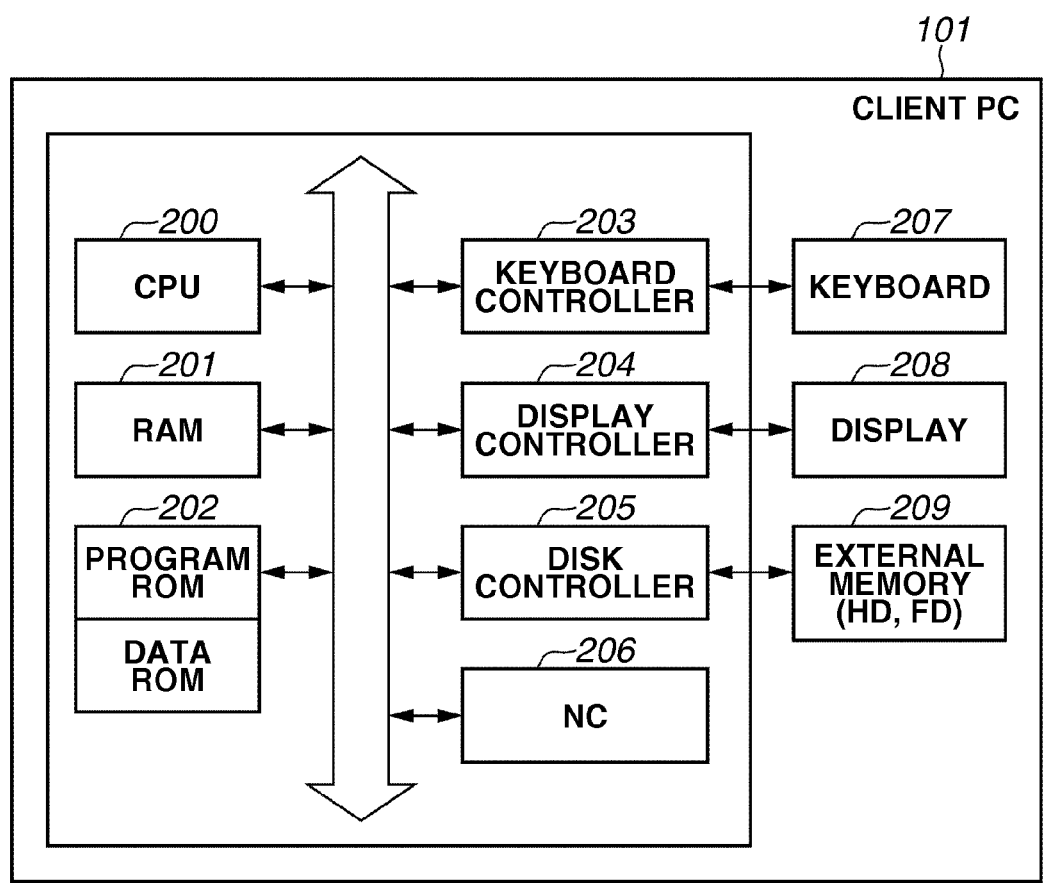
FIG. 2 is a block diagram illustrating an example of a hardware configuration of a client personal computer (PC) configuring a printing control system according to an exemplary embodiment of the present invention.

FIG. 2 is a block diagram illustrating an example of a hardware configuration of the client PC 101 configuring a printing control system. The hardware configuration illustrated in FIG. 2 corresponds to the hardware configuration of a typical information processing apparatus. For the client PC 101 according to the present exemplary embodiment, a typical information processing apparatus hardware configuration may be applied. Further, the user management server 103 can also be realized by using an information processing apparatus having the hardware configuration illustrated in FIG. 2.

In FIG. 2, a central processing unit (CPU) 200 executes a program, such as an operating system (OS) or an application, which is stored in a read-only memory (ROM) 202 for program or is loaded in a random access memory (RAM) 201 from an external memory 209. Here, "OS" is an abbreviation for "operating system", which runs on the computer. The processing in the below-described flowcharts can be realized by execution of this program. The RAM 201 functions as a main memory and work area for the CPU 200.

A keyboard controller 203 controls key inputs (operation inputs) from a keyboard 207 or a pointing device (not-illustrated). A display controller 204 controls display of various displays 208. A disk controller 205 controls data access to the external memory 209, such as a hard disk (HD) or a floppy disk (FD) storing various kinds of data. A network controller (NC) 206 is connected to the network 104, and executes communication control processing with other devices, which are connected to the network 104.

Figure 3:
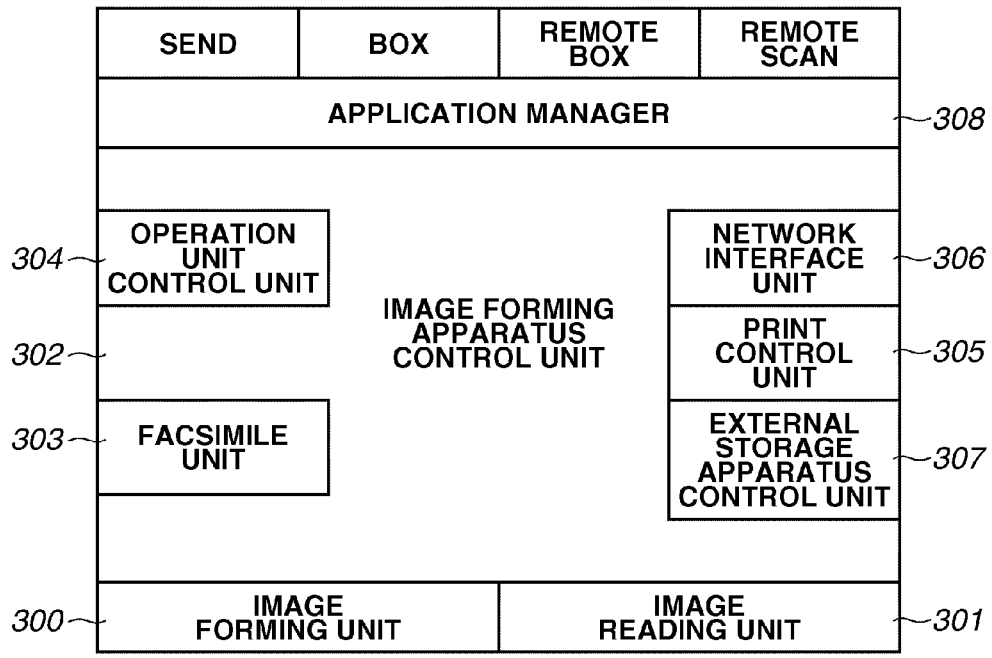
FIG. 3 hierarchically illustrates a configuration of an image forming apparatus configuring a printing control system according to an exemplary embodiment of the present invention.

FIG. 3 hierarchically illustrates a configuration of the image forming apparatus 102 configuring a printing control system.

In FIG. 3, an image forming unit 300 forms (outputs) an image on a recording medium such as a sheet of recording paper by executing a series of image formation processes, such as paper handling, image transfer/fixing and the like. The image forming unit 300 includes an inkjet printer or an electrophotographic image forming unit, for example.

An image reading unit 301 includes a scanner and the like. The image reading unit 301 can form an image by optically reading an original image, converting the read image into digital image information, and outputting the digital image information to the image forming unit 300. Further, the image reading unit 301 can also transfer the thus-obtained digital image information to a facsimile unit 303 or a network interface unit 306 for transmission to other devices via the network 104 (line).

An image forming apparatus control unit 302 controls each operation of the image forming unit 300 and the image reading unit 301. For example, the image forming apparatus control unit 302 controls thereof so that information about the original document read by the image reading unit 301 is copied by the image forming unit 300. Further, the image forming apparatus control unit 302 has an external storage apparatus control unit 307, the network interface unit 306, a print control unit 305, the facsimile unit 303, and an operation unit control unit 304, and controls the exchange of information among these units.

The facsimile unit 303 receives and sends facsimile images. More specifically, the facsimile unit 303 can execute processing for sending digital image information read by the image reading unit 301 to another device via the network interface unit 306. In addition, the facsimile unit 303 can execute processing such as decoding a facsimile signal received from another device via the network interface unit 306, and recording the decoded signal using the image forming unit 300.

The operation unit control unit 304 controls signal generation according to an operation by the user using an operation panel of an operation unit in the image forming apparatus 102. Further, the operation unit control unit 304 controls the display of various kinds of data and messages on a display unit in an operation unit of the image forming apparatus 102.

The print control unit 305 controls printing by, for example, processing print data input from another device via the network interface unit 306, and outputting the resultant print data to the image forming unit 300. The network interface unit 306 controls the sending and receiving of data with other communication terminals via a communication line.

When the image read by the image reading unit 301 is converted into a data format that can be stored in an external storage apparatus by the image forming unit 300, the external storage apparatus control unit 307 can store the data of that image in the external storage apparatus. Further, the external storage apparatus control unit 307 reads data stored in the external storage apparatus, and outputs the read data to the image forming unit 300 or the network interface unit 306. Consequently, the image forming unit 300 can perform print processing of the data stored in the external storage apparatus.

The network interface unit 306 can also send the data stored in the external storage apparatus to another device.

An application manager 308 manages applications such as copying, scanning, and scan sending. The application manager 308 receives start-up, shut down, installation, and uninstallation of the respective applications. Further, the application manager 308 also receives information generated by the image forming apparatus control unit 302, and controls the respective applications based on the received information.

Figure 4:
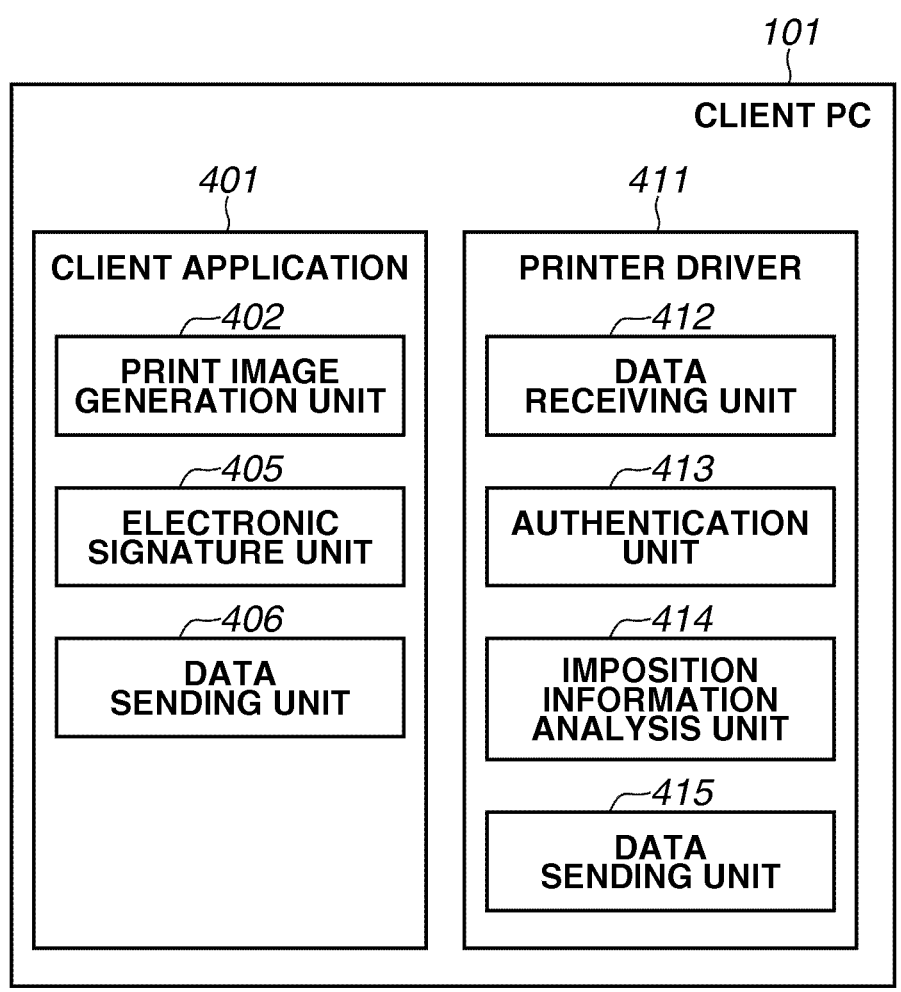
FIG. 4 is a block diagram illustrating an example of a software configuration of a printing control system according to an exemplary embodiment of the present invention.

FIG. 4 is a block diagram illustrating an example of a software configuration of a printing control system. More specifically, FIG. 4 illustrates an example of the software configuration in the client PC 101. As illustrated in FIG. 4, the client PC 101 includes at least a client application 401 and a printer driver 411. The client application 401 has a print image generation unit 402, an electronic signature unit 405, and a data sending unit 406. In the following, description about processing units, which are not directly related to the description of the present exemplary embodiment, will be omitted.

The print image generation unit 402 generates a virtually imposed image based on the setting set by the user. For example, if the user set a 4-page document to be output onto a sheet of paper in 4-in-1, the print image generation unit 402 generates a 4-in-1 image as one image, and then transfers that data to the printer driver 411. Since there is one image, the printer driver 411 recognizes the image as a 1-in-1 image.

The electronic signature unit 405 generates a certificate for identifying the client application 401, which is the generation source of the print data to be sent to the printer driver 411. Examples of a means for generating the certificate include encoding the application name (or ID) with an application secret key.

The data sending unit 406 includes the certificate generated by the electronic signature unit 405 and the imposition information designated by the user in print data, and sends that print data to the printer driver 411. At this stage, as a known method, for example, a hash value of the whole print data can be calculated by a hash function, and then the electronic certificate can be added to that hash value. In such a case, it can be checked whether the electronic certificate has been falsified by verifying the electronic certificate on the verifying side (the printer driver 411 or the image forming apparatus 102).

The printer driver 411 has a data receiving unit 412, an authentication unit 413, an imposition information analysis unit 414, and a data sending unit 415. Further, although the printer driver 411 also has a data conversion unit for performing typical rasterization processing and the like, the data conversion unit can be executed with known technology, and thus a detailed description thereof is omitted here.

The data receiving unit 412 receives data sent from the data sending unit 406. The authentication unit 413 performs authentication using the certificate included in the print data received by the data receiving unit 412. More specifically, for example, the name (or ID) of applications permitting processing as an exception is registered in advance in a predetermined location in the printer driver 411 or the printing control system.

The authentication unit 413 decodes the application name (or ID) encoded by the secret key with a public key, and determines whether the decoded application name (or ID) and the pre-registered application name (or ID) match with each other. If it is determined that there is a match, the authentication unit 413 determines that authentication is successful.

The imposition information analysis unit 414 performs control so that the image received by the data receiving unit 412 is output in a correct format using the imposition information included in the print data received by the data receiving unit 412. To describe this more specifically, an example will now be described in which the print image generation unit 402 sent the data as one image of 1-in-1, despite the user setting to 4-in-1.

In this case, the imposition information analysis unit 414 determines whether the application is a sending source whose data was successfully authenticated by the authentication unit 413. If it is determined that the application is the sending source whose data was successfully authenticated by the authentication unit 413, the imposition information analysis unit 414 trusts the imposition setting (in this case, 4-in-1) set by the user, and determines that printing of the received image is in 4-in-1.

The data sending unit 415 sends the print data generated by undergoing the various kinds of processing performed by the printer driver 411 to the image forming apparatus 102. For a configuration in which the access control processing is performed in the image forming apparatus 102, the processing performed by the authentication unit 413 and the imposition information analysis unit 414 may be executed in the image forming apparatus 102.

The processing performed in each step of the printing control system according to the first exemplary embodiment of the present invention will now be described in more detail using FIG. 6.

Figure 6A:
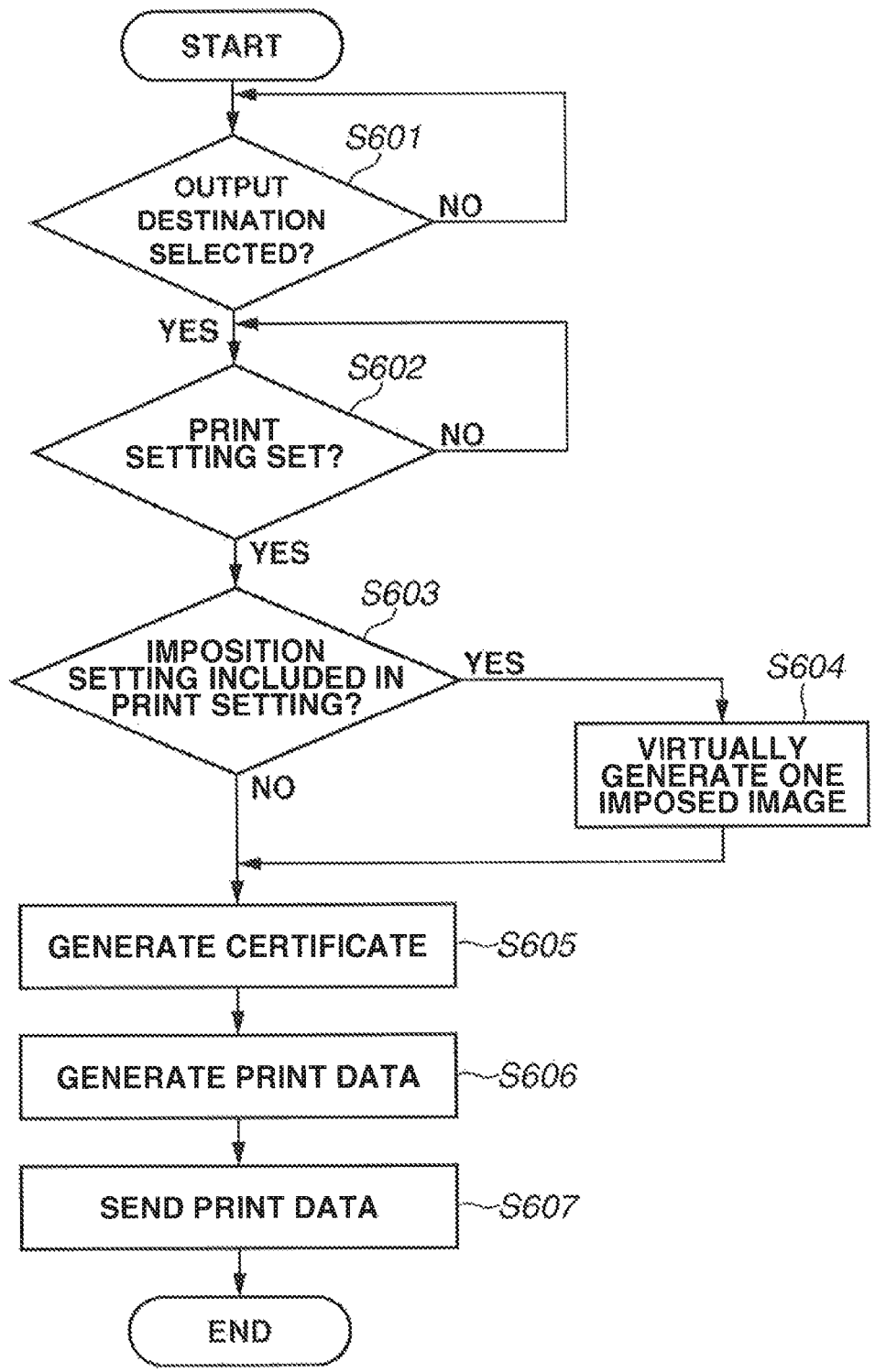
FIG. 6A is a flowchart illustrating example processing performed by a client application during print processing according to an exemplary embodiment of the present invention.

FIG. 6A is a flowchart illustrating example processing performed by the client application 401 during print processing. In this example, the user has already logged in before the flowchart in FIG. 6A starts.

In step S601 of FIG. 6A, the client application 401 waits until a selection from the image forming apparatus 102 of an output destination by the user is received (NO in step S601). When the selection from the image forming apparatus 102 of the output destination is received (YES in step S601), the processing proceeds to step S602. In step S602, the client application 401 waits until a print setting from the user is received (NO in step S602).

The imposition setting, which has an important meaning in the present exemplary embodiment, is received in the step S602. When the print setting is received (YES in step S602), the processing proceeds to step S603. Thus, in the present exemplary embodiment, for example, by performing the processing of step S602, an example of a receiving unit is realized.

In step S603, the client application 401 determines whether a 2 up or more imposition setting is included in the print setting received in step S602. If an imposition setting is included in the print setting (YES in step S603), the processing proceeds to step S604.

In step S604, the print image generation unit 402 generates one image, which virtually looks like N-in-1, based on the imposition setting set in step S602. Then, the processing proceeds to step S605. Thus, in the present exemplary embodiment, for example, by performing the processing of step S604, an example of a generation unit is realized.

On the other hand, in step S603, if it is determined that the imposition setting is not included in the print setting (NO in step S603), step S604 is skipped, and the processing proceeds to step S605.

In step S605, the electronic signature unit 405 generates an electronic certificate indicating that it was sent from the client application 401. Thus, in the present exemplary embodiment, for example, by performing the processing of step S605, an example of a second generation unit is realized.

Then, in step S606, the data sending unit 406 generates print data that includes the certificate generated in step S605 and information about the imposition (imposition information) set in step S602. Further, as described above, optionally, the client application 401 calculates a hash value for the print data and adds an electronic certificate to the hash value. Next, in step S607, the data sending unit 406 sends the print data generated in step S606 to the printer driver 411.

Figure 6B:
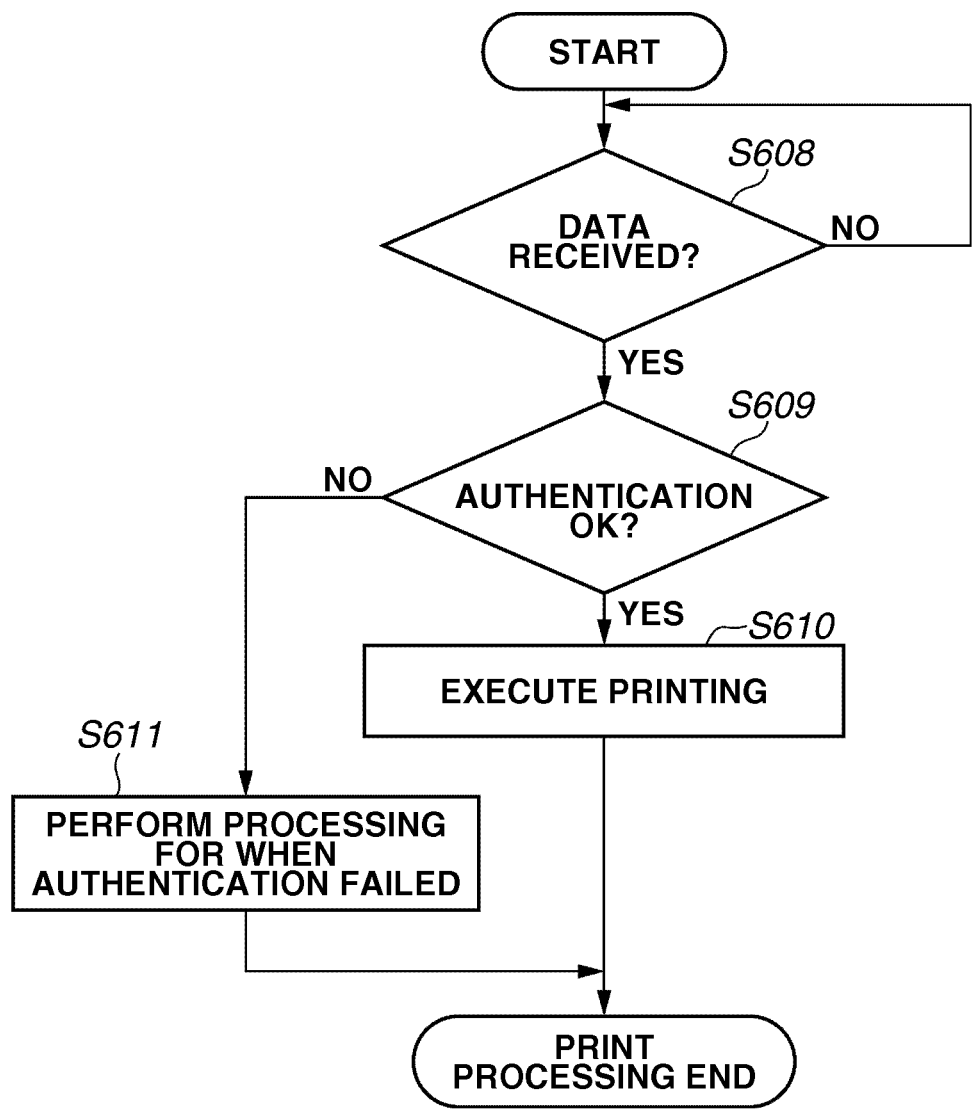
FIG. 6B is a flowchart illustrating example processing performed by a printer driver during print processing according to an exemplary embodiment of the present invention.

FIG. 6B is a flowchart illustrating example processing performed by the printer driver 411 during print processing.

In step S608 in FIG. 6B, the data receiving unit 412 of the printer driver 411 waits for the print data sent from the data sending unit 406 of the client application 401 (NO in step S608). When the print data sent from the data sending unit 406 of the client application 401 is received (YES in step S608), the processing proceeds to step S609.

In step S609, the authentication unit 413 performs authentication using the certificate included in the received print data to determine whether the client application 401, which is the sending source of the print data, is pre-registered as an application permitted by the printing control system. If the client application 401, which is the sending source of the print data, is registered as an application permitted by the printing control system (YES in step S609), authentication is determined to have been successful, and the processing proceeds to step S610. Thus, in the present exemplary embodiment, for example, by performing the processing of step S609, an example of a first confirmation unit is realized.

In step S610, the imposition information analysis unit 414 executes print processing by trusting, as an exception, the imposition information relating to the image based on the "printing target image and the imposition information" included in the print data received by the data receiving unit 412.

More specifically, even if the image is a 1-in-1 image, for example, if the image was set as N-in-1 in step S602, print processing is performed by permitting processing as an exception for the printer driver 411 and the image forming apparatus 102 despite restrictions based on the access control information. Alternatively, in step S610, the imposition information analysis unit 414 may add the information that N-in-1 printing is possible as an exception, and pass on that information for subsequent processing.

Then, the printer driver 411 performs ordinary data conversion processing relating to printing, and the data sending unit 415 sends the print data to the image forming apparatus 102. Subsequently, print processing is performed based on the above-described conventional example and known methods. Thus, in the present exemplary embodiment, for example, by performing the processing of step S610, and the related processing of the printer driver 411 and the image forming apparatus 102, an example of an output unit is realized.

In step S609, if the client application 401, which is the sending source of the print data, is not registered as an application permitted by the printing control system (NO in step S609), authentication is determined to have failed, and the processing proceeds to step S611.

More specifically, if authentication failed in step S609, there is a possibility that the print out is not performed correctly by the imposition setting in step S602. Therefore, the printer driver 411 performs the processing for when authentication failed. An example of the processing for when authentication failed is to issue a warning message.

Thus, in the present exemplary embodiment, when there is an instruction to print in N-in-1 from the user 105, the client application 401 generates print data that includes one 1-in-1 image in which N-in-1 is virtually imposed, a self-identifying certificate, and imposition information. Then, the client application 401 sends the generated print data to the printer driver 411.

Using the certificate included in the print data sent from the client application 401, the printer driver 411 determines whether the client application 401, which is the sending source of the print data, is permitted processing as an exception. If it is determined that the client application 401 is permitted processing as an exception, the printer driver 411 performs print processing for printing the one N-in-1 virtually imposed image as is, regardless of the pre-set imposition setting.

Therefore, for example, even if the imposition restriction "printing is prohibited unless 2-in-1 or greater" is set for the client application 401, the printer driver 411 can process the 1-in-1 image from the client application 401 as an exception. Thus, the present exemplary embodiment can prevent the situation in which printing cannot be performed correctly despite the fact that the user 105 sets an imposition setting in a restricted area, more reliably than in the conventional system.

In the present exemplary embodiment, to perform the authentication in step S609 illustrated in FIG. 6B, a method is described in which, in step S606 in FIG. 6A, a certificate identifying the client application 401 is attached to the data and sent to the printer driver 411.

However, the basic idea lies in the portion that the attached imposition information concerning the print data sent from a specific application is trusted. Therefore, it is not always necessary to determine, as illustrated in FIGS. 6A and 6B, whether the print data is sent from a specific application.

For example, information about the client application 401 can be sent to the image forming apparatus 102, and the image forming apparatus 102 can send back access control information indicating that a specific operation only is permitted for the client application 401 (refer to the above-described FIG. 5). Further, the client application 401 can acquire the access control information, and using that access control information, determine whether imposition is possible or not.

Further, in the present exemplary embodiment, in step S602 in FIG. 6A, a description concerning the case in which the imposition setting set by the user does not satisfy the restriction based on the access control information is omitted. However, in actual practice, this determination is performed in step S610 or the subsequent print processing.

Next, a second exemplary embodiment according to the present invention will be described. The present exemplary embodiment describes a specific example in which the client application acquires access control information from the image forming apparatus, and the determination processing is performed in the client application.

Therefore, the main differences between the present exemplary embodiment and the first exemplary embodiment are the configuration and the processing for determining whether printing can be executed based on virtual imposition. For example, the system configuration, hardware configuration, and access control information format are similar to those in the first exemplary embodiment. Accordingly, in the description of the present exemplary embodiment, portions, which are identical with those in the above-described first exemplary embodiment, are provided with the same reference numerals as in FIGS. 1 to 6, and a detailed description of such portions is omitted here.

Figure 7:
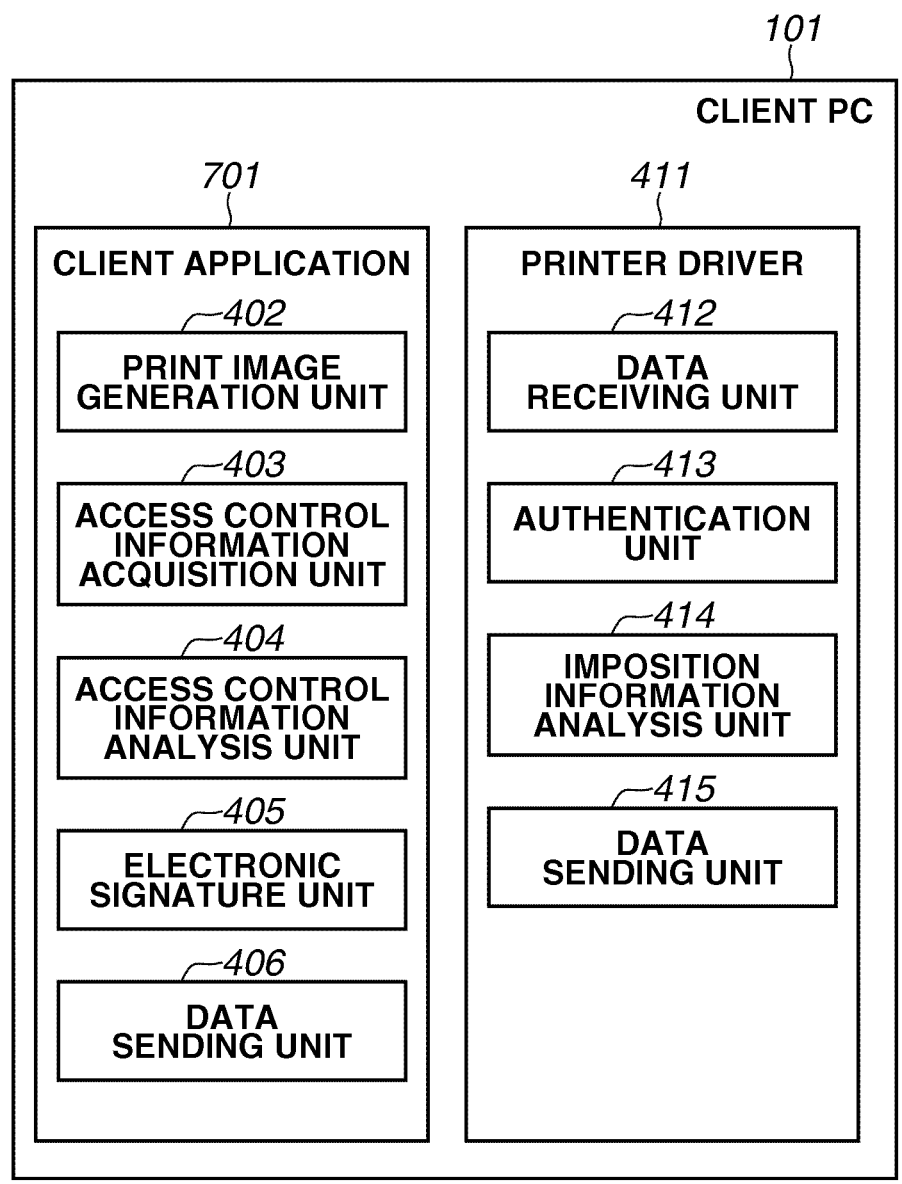
FIG. 7 is a block diagram illustrating an example of a software configuration of a printing control system according to an exemplary embodiment of the present invention.

FIG. 7 is a block diagram illustrating an example of a software configuration of a printing control system. More specifically, FIG. 7 illustrates an example of the software configuration in the client PC 101. As illustrated in FIG. 7, the client PC 101 includes at least a client application 701 and the printer driver 411. The client application 701 is different from the first exemplary embodiment in having an access control information acquisition unit 403 and an access control information analysis unit 404 (refer to FIG. 4).

The access control information acquisition unit 403 acquires access control information (refer to FIG. 5) from the image forming apparatus 102 via the data sending unit 406. If the access control information is stored by the user management server 103, the access control information acquisition unit 403 acquires the access control information from the user management server 103 via the data sending unit 406.

The access control information analysis unit 404 analyzes the access control information acquired by the access control information acquisition unit 403, and performs two kinds of determination. The first is whether the imposition setting set by the user satisfies the imposition setting set by the access control information. The second is whether the image generated by the print image generation unit 402 satisfies the imposition setting set by the access control information.

FIG. 8A is a flowchart illustrating example processing performed by the client application 701 during print processing. In this example, the user has already logged in before the flowchart in FIG. 8A starts.

As described above, in steps S601 to 603, when the selection from the sending destination image forming apparatus 102 is received, and the print setting is received, the client application 701 then determines whether a 2 up or more imposition setting is included in the print setting.

If an imposition setting is included in the print setting (YES in step S603), the processing proceeds to step S604. In step S604, the print image generation unit 402 generates one N-in-1 virtually imposed image based on the imposition setting set in step S602. Then, the processing proceeds to step S621.

On the other hand, if it is determined that an imposition setting is not included in the print setting (NO in step S603), step S604 is skipped, and the processing proceeds to step S621. Thus, in the present exemplary embodiment, for example, by performing the processing of step S601, an example of a receiving unit is realized, and by performing the processing of step S604, an example of a generation unit is realized.

In step S621, the access control information acquisition unit 403 acquires the access control information from the image forming apparatus 102. Thus, in the present exemplary embodiment, for example, by performing the processing of step S621, an example of an acquisition unit is realized. Further, in the present exemplary embodiment, for example, an example of setting control information is realized based on the access control information.

Then, in step S622, the access control information analysis unit 404 analyzes the access control information acquired in step S621.

Next, in step S623, the access control information analysis unit 404 determines whether the imposition setting set in step S602 satisfies the restriction imposed on the client application 701, based on the result of the analysis of the access control information.

If the imposition setting set in step S602 does not satisfy the restriction (NO in step S623), the processing proceeds to step S624. In step S624, the access control information analysis unit 404 performs the processing for when printing execution is impossible. Examples of the processing for when printing execution is impossible include displaying an error message, or automatically converting the imposition setting into a format that satisfies the access control information, and executing printing by changing the virtually imposed image based on this imposition setting.

Thus, in the present exemplary embodiment, for example, by performing the processing of step S623, an example of a second determination unit is realized. Further, an example of a changing unit is realized by converting the imposition setting in step S624.

On the other hand, if it is determined in step S623 that the imposition setting set in step S602 satisfies the restriction (YES in step S623), the processing proceeds to step S625. In step S625, the access control information analysis unit 404 determines whether the "one virtually imposed image" generated in step S604 is an image that satisfies the restriction imposed on the client application 701 based on the result of analysis of the access control information.

If the processing has not gone through step S604, the access control information analysis unit 404 determines whether the image, which is not virtually imposed, satisfies the restriction. Here, an example will be considered in which, based on the access control information, the restriction that "printing is prohibited unless 4-in-1 or greater" is imposed on the client application 701, and in step S602 the user sets the processing to perform 4-in-1 imposition.

In such a case, the image generated in step S604 becomes a 1-in-1 image. Accordingly, the printing target image does not satisfy the restriction imposed on the client application 701 (NO in step S625). At this stage, the processing of the electronic certificate of step S605 is performed for the first time. The subsequent processing is the same as that in the first exemplary embodiment. More specifically, in steps S605 to S607, print data including the certificate and the imposition information is generated, and the data sending unit 406 sends the generated print data to the printer driver 411.

Thus, in the present exemplary embodiment, for example, by performing the processing of step S625, an example of a determination unit is realized. Further, an example of a second generation unit is realized by performing the processing of step S605.

In step S625, if the printing target image satisfies the restriction imposed on the client application 701 (YES in step S625), the processing proceeds to step S626. In step S626, the data sending unit 406 sends N 1-in-1 images and the imposition information indicating printing in N up to the printer driver 411 based on the imposition setting set in step S602.

Thus, in the present exemplary embodiment, for example, by performing the processing of step S626, an example of a third generation unit is realized.

FIG. 8B is a flowchart illustrating example processing performed by the printer driver 411 during print processing.

In step S608 in FIG. 8B, when the data receiving unit 412 receives the print data sent from the data sending unit 406 of the client application 701 (YES in step S608), the processing proceeds to step S627. In step S627, the authentication unit 413 determines whether the certificate is included in the received print data.

If the certificate is included in the received print data (YES in step S627), the processing subsequent to step S609 is performed in the same manner as in the first exemplary embodiment. More specifically, if authentication using the certificate is successful, in step S610, the printer driver 411 trusts the imposition information included in the print data, and performs print processing to print the one N-in-1 virtually imposed image as it is. On the other hand, if authentication using the certificate fails (NO in step S609), the processing proceeds to step S611. In step S611, the printer driver 411 performs the processing for when authentication failed.

Thus, in the present exemplary embodiment, for example, by performing the processing of step S609, an example of a confirmation unit is realized. Further, by performing the processing of step S610, and the related processing of the printer driver 411 and the image forming apparatus 102, an example of an output unit is realized.

If it is determined in step S627 that the certificate is not included in the received print data (NO in step S627), the processing proceeds to step S628. In this case, in step S626 in FIG. 8A, since the print image and the imposition information are sent, the printer driver 411 executes ordinary print processing. Thus, in the present exemplary embodiment, for example, by performing the processing of step S628, an example of an output unit is realized.

Thus, in the present exemplary embodiment, based on the access control information, if the imposition setting set by the user satisfies the restriction and the generated image satisfies the restriction, the client application 701 sends this image and the imposition information to the printer driver 411.

Further, if the imposition setting set by the user satisfies the restriction, but the generated image does not satisfy the restriction, the client application 701 generates the certificate, and sends print data including that certificate and the imposition information to the printer driver 411.

Therefore, in addition to the benefits described for the first exemplary embodiment, the additional benefit that, if the imposition setting set by the user and the generated image satisfy the restriction, the processing for generating and authenticating the certificate can be omitted, can be obtained.

Next, a third exemplary embodiment according to the present invention will be described. The present exemplary embodiment describes a specific example in which the client application acquires access control information from the image forming apparatus, and the determination processing is performed in the client application. Further, in the present exemplary embodiment, the imposition method of the client application is changed based on the access control information.

Thus, the main differences between the present exemplary embodiment and the second exemplary embodiment are that there is no processing relating to generation and authentication of the certificate, and the contents of the configuration and the processing relating to changing the imposition method of the client application.

For example, the system configuration, hardware configuration, and access control information format are similar to those in the first and second exemplary embodiments. Accordingly, in the description of the present exemplary embodiment, portions, which are identical with those in the above-described first and second exemplary embodiments, are provided with the same reference numerals as in FIGS. 1 to 8, and a detailed description of such portions is omitted here.

Figure 9:
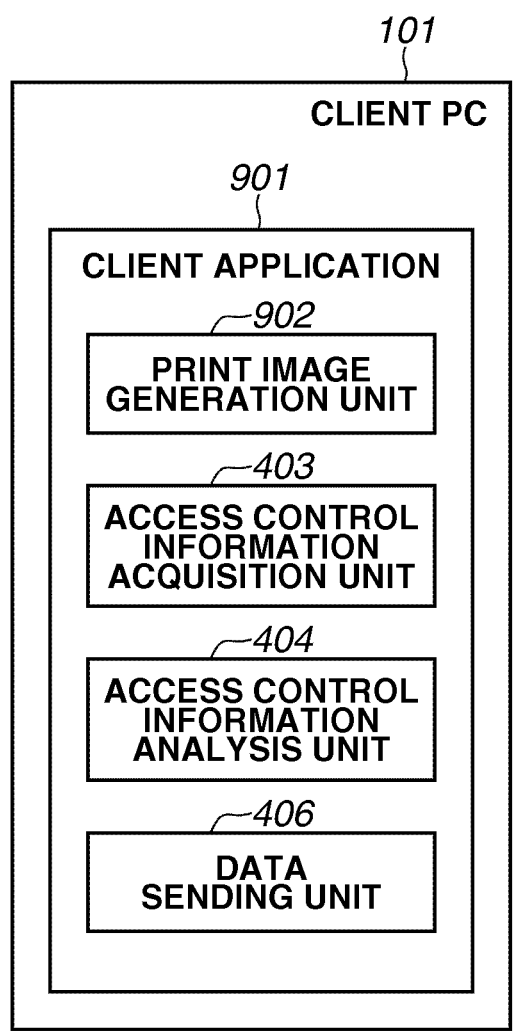
FIG. 9 is a block diagram illustrating an example of a software configuration of a printing control system according to an exemplary embodiment of the present invention.

FIG. 9 is a block diagram illustrating an example of a software configuration of a printing control system. More specifically, FIG. 9 illustrates an example of the software configuration in the client PC 101.

The client PC 101 includes at least a client application 901 and the printer driver 411. However, the printer driver 411 does not have any portions characteristic to the present exemplary embodiment, and thus a description of the printer driver 411 is omitted in the present exemplary embodiment.

The client application 901 illustrated in FIG. 9 is different from the client application 701 according to the second exemplary embodiment in not having the electronic signature unit 405 and in the processing contents of a print image generation unit 902.

The print image generation unit 902 in the client application 901 generates one virtually imposed image based on the imposition setting set by the user in the same manner as in the first and second exemplary embodiments. Further, in the present exemplary embodiment, the print image generation unit 902 changes the imposition method and perform control so that printing is correctly performed based on the result of analysis by the access control information analysis unit 404.

More specifically, in the access control information, when a restriction is imposed relating to imposition, the print image generation unit 902 does not generate a virtually imposed image. Consequently, similar to ordinary printing, N 1-in-1 images and the imposition information indicating printing by N up are sent to the printer driver 411.

Figure 10:
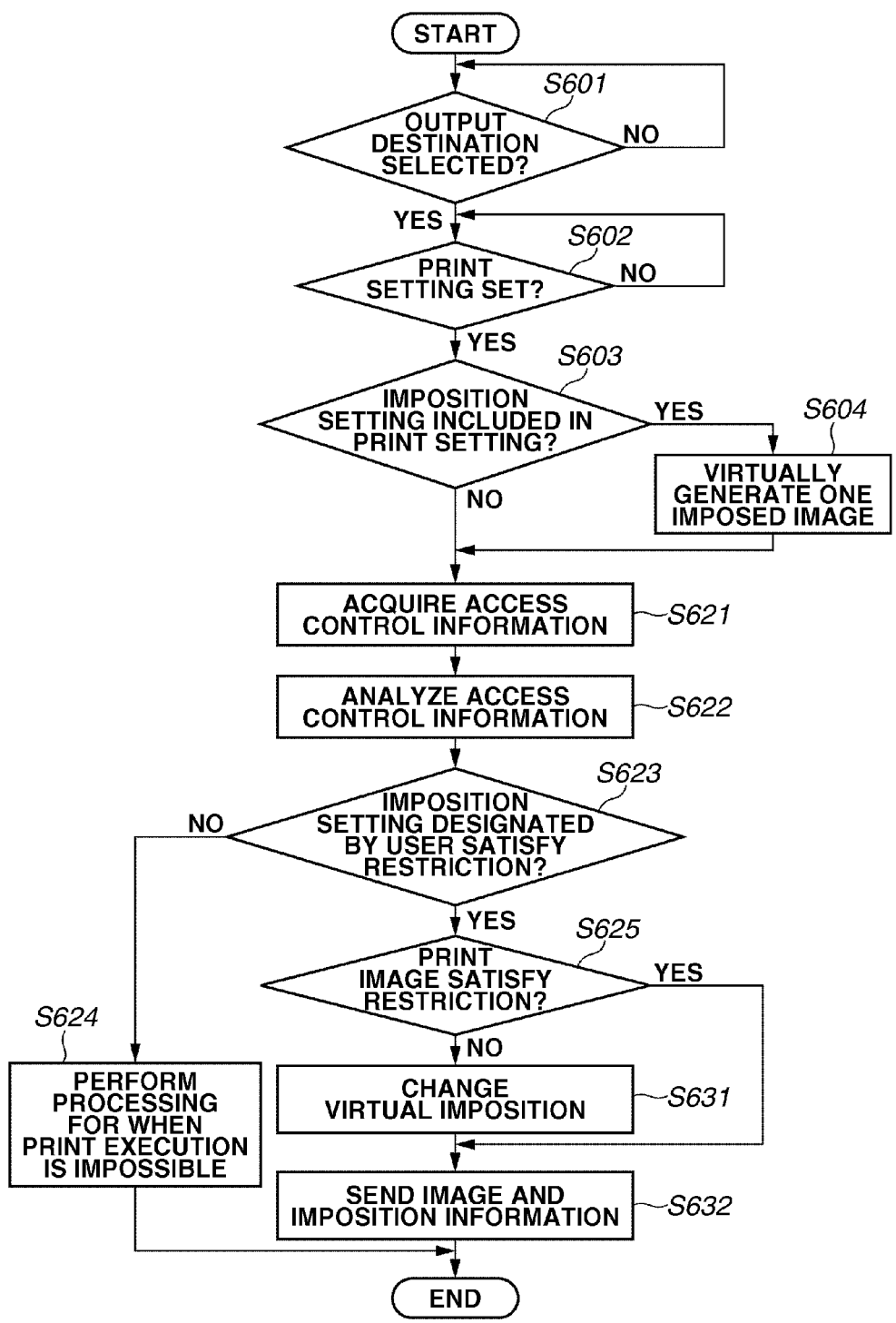
FIG. 10 is a flowchart illustrating example processing performed by a client application during print processing according to an exemplary embodiment of the present invention.

FIG. 10 is a flowchart illustrating example processing performed by the client application 901 during print processing. In this example, the user has already logged in before the flowchart in FIG. 10 starts.

As described above, in steps S601 to 603, when the selection from the sending destination image forming apparatus 102 is received, and the print setting is received, the client application 901 then determines whether a 2 up or more imposition setting is included in the print setting. If it is determined that an imposition setting is included in the print setting (YES in step S603), the processing proceeds to step S604. In step S604, the print image generation unit 402 generates one N-in-1 virtually imposed image based on the imposition setting set in step S602. Then, the processing proceeds to step S621. On the other hand, if it is determined that an imposition setting is not included in the print setting (NO in step S603), step S604 is omitted, and the processing proceeds to step S621.

Thus, in the present exemplary embodiment, for example, by performing the processing of step S601, an example of a receiving unit is realized. Further, by performing the processing of step S604, an example of a generation unit is realized.

Then, in steps S621 to S624, based on the result of analyzing the access control information, if the imposition setting does not satisfy the restriction imposed on the client application 901 (NO in step S623), the access control information analysis unit 404 performs the processing for when printing execution is impossible. On the other hand, if the imposition setting satisfies the restriction imposed on the client application 901 (YES in step S623), the processing proceeds to step S625. In step S625, the access control information analysis unit 404 determines whether the printing target image satisfies the restriction imposed on the client application 901.

If the printing target image does not satisfy the restriction imposed on the client application 901 (NO in step S625), the processing proceeds to step S631. In step S631, the print image generation unit 902 deletes the "one virtually imposed image" generated in step S604, and changes the virtual imposition so as to revert to a one-page one-image state.

Thus, in the present exemplary embodiment, for example, by performing the processing of step S604, an example of a generation unit is realized, and by performing the processing of step S621, an example of an acquisition unit is realized. Further, for example, by performing the processing of step S623, an example of a second determination unit is realized, and by performing the processing of step S625, an example of a determination unit is realized. In addition, by performing the processing of step S631, an example of a second generation unit is realized.

Then, in step S632, the data sending unit 406 sends images of multiple pages (N pages) generated in step S801 and the imposition information set in step S602 to the printer driver 411. More specifically, in the present exemplary embodiment, without an aggregate image being virtually created by the print image generation unit 902, as described above, N 1-in-1 images and imposition information indicating printing by N up are sent to the printer driver 411.

Then, imposition processing is performed by the printer driver 411. Consequently, printing may be performing normally. Thus, in the present exemplary embodiment, for example, by performing the processing of step S632, and the related processing of the printer driver 411 and the image forming apparatus 102, an example of an output unit is realized.

In step S625, if the printing target image satisfies the restriction imposed on the client application 901 (YES in step S625), the processing proceeds to step S632 without performing step S631.

Thus, in the present exemplary embodiment, if the imposition setting set by the user satisfies the restriction, but the generated image does not satisfy the restriction, the client application 901 instructs the printer driver 411 to print N images in N-in-1 without performing virtual imposition. Therefore, in addition to the benefits described for the first exemplary embodiment, the additional benefit that the processing for generating and authenticating the certificate can be omitted can be obtained.

Further, although the present exemplary embodiment has been described as having a sequence in which imposition processing is deactivated in step S631 after the virtual imposition processing had been performed in step S604, the processing does not have to be performed in such a manner.

For example, steps S621 and S622 can be performed before steps S603 and S604, and in step S625 it can be determined "whether the access control information (restriction) will be contravened if it is assumed that a virtual imposition is performed". If it is determined that the access control information will not be contravened, the processing of steps S603 and S604 is performed. According to such a configuration, for example, by performing the processing corresponding to step S625, an example of a determination unit is realized, and by performing the processing corresponding to step S604, an example of a generation unit is realized.

Next, a fourth exemplary embodiment according to the present invention will be described. In the present exemplary embodiment, it is determined whether printing based on virtual imposition can be executed based on an analysis result about a layout of the printing target image, instead of an analysis result about the certificate or the access control information. Therefore, the main differences between the present exemplary embodiment and the first to third exemplary embodiments are the configuration and the processing for determining whether printing can be executed based on virtual imposition.

For example, the system configuration, hardware configuration, and access control information format are similar to those in the first to third exemplary embodiments. Accordingly, in the description of the present exemplary embodiment, portions, which are identical with those in the above-described first to third exemplary embodiments, are provided with the same reference numerals as in FIGS. 1 to 10, and a detailed description of such portions is omitted here.

Figure 11:
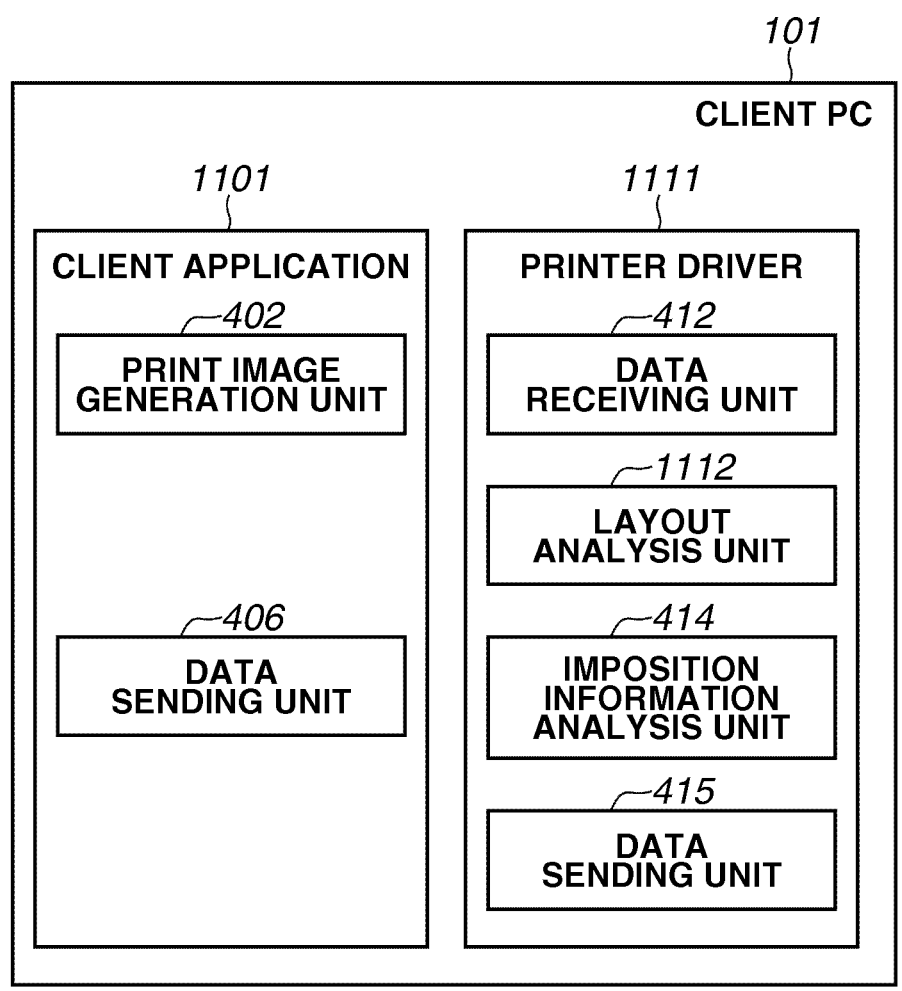
FIG. 11 is a block diagram illustrating an example of a software configuration of a printing control system according to an exemplary embodiment of the present invention.

FIG. 11 is a block diagram illustrating an example of a software configuration of a printing control system. More specifically, FIG. 11 illustrates an example of the software configuration in the client PC 101. The client PC 101 includes at least a client application 1101 and a printer driver 1111.

The present exemplary embodiment is different from the first exemplary embodiment in not having the electronic signature unit 405 in the client application 1101, in not having an authentication unit 413 in the printer driver 1111, and having a layout analysis unit 1112 in the printer driver 1111 (refer to FIG. 4).

The layout analysis unit 1112 in the printer driver 1111 automatically recognizes the layout of the image generated by the print image generation unit 402 in the client application 1101, and based on the recognition result, grasps the imposition setting designated by the user. For the automatic recognition of the image layout, for example, generally known image recognition technology can be utilized. However, since such image recognition technology is well known, a detailed description will be omitted here.

FIG. 12A is a flowchart illustrating example processing performed by the client application 1101 during print processing. In this example, the user has already logged in before the flowchart in FIG. 12A starts.

As described above, in steps S601 to 603, when the selection from the sending destination image forming apparatus 102 is received, and the print setting is received, the client application 1101 then determines whether a 2 up or more imposition setting is included in the print setting. If it is determined that an imposition setting is included in the print setting (YES in step S603), the processing proceeds to step S604. In step S604, the print image generation unit 402 generates one N-in-1 virtually imposed image based on the imposition setting set in step S602. Then, the processing proceeds to step S641.

On the other hand, if it is determined that an imposition setting is not included in the print setting (NO in step S603), step S604 is skipped, and the processing proceeds to step S641. Thus, in the present exemplary embodiment, for example, by performing the processing of step S601, an example of a receiving unit is realized. Further, by performing the processing of step S604, an example of a generation unit is realized.

In step S641, the data sending unit 406 sends the "one virtually imposed image" generated in step S604 to the printer driver 411. If the processing has not gone through step S604, the data sending unit 406 sends the image that is not virtually imposed and the imposition information to the printer driver 411.

Figure 12B:
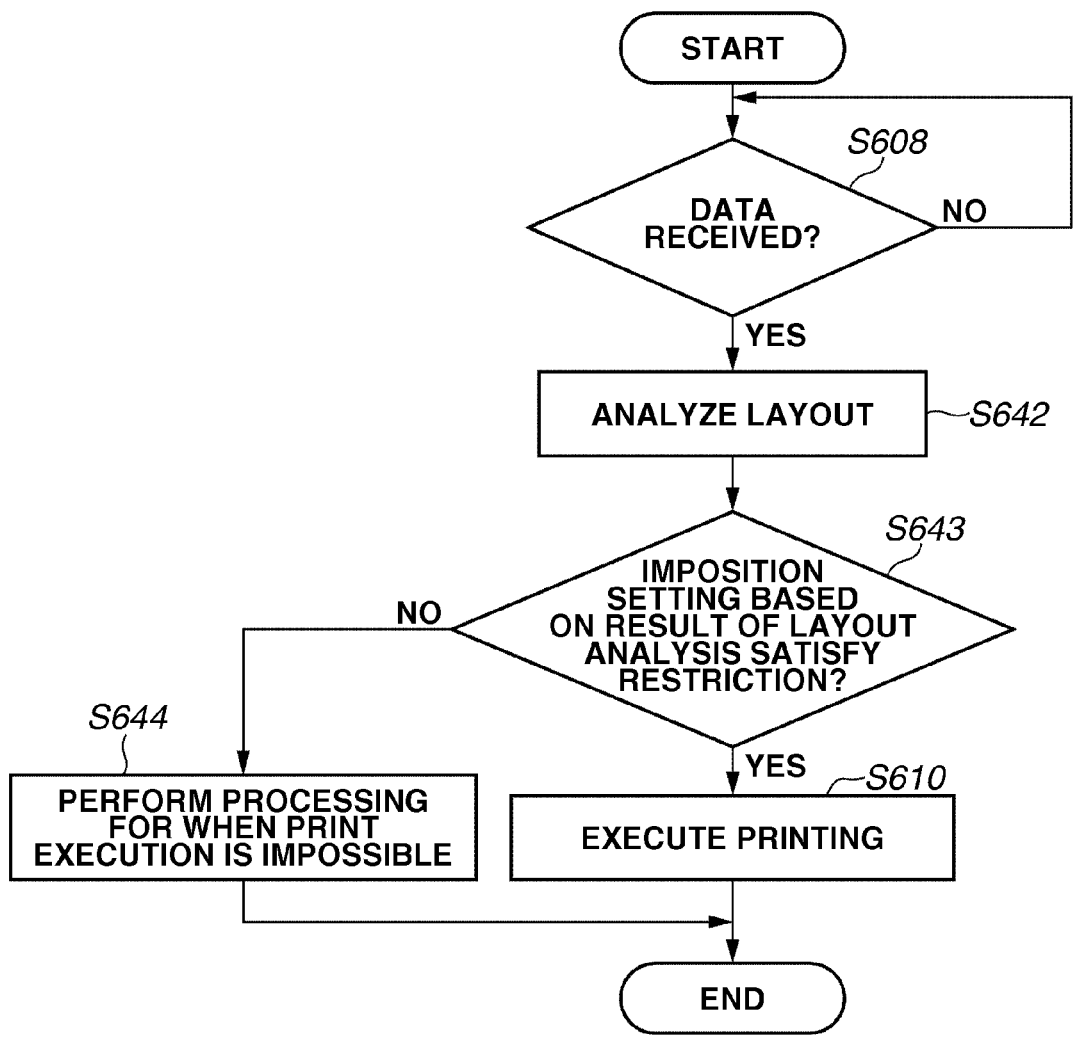
FIG. 12B is a flowchart illustrating example processing performed by a printer driver during print processing according to an exemplary embodiment of the present invention.

FIG. 12B is a flowchart illustrating example processing performed by the printer driver 1111 during print processing.

In step S608 in FIG. 12B, if the image sent from the data sending unit 406 of the client application 1101 is received by the data receiving unit 412 (YES in step S608), the processing proceeds to step S642. In step S642, the layout analysis unit 1112 automatically recognizes the layout of the image received by the data receiving unit 412. Consequently, the layout analysis unit 1112 can acquire (estimate) information about the imposition setting set by the user in step S602 in FIG. 12A. Thus, in the present exemplary embodiment, for example, by performing the processing of step S642, an example of an estimation unit is realized.

In step S643, the imposition information analysis unit 414 determines whether the imposition setting acquired in step S642 satisfies the restriction based on the access control information acquired in advance from the image forming apparatus 102. If it is determined that the imposition setting acquired in step S642 satisfies the restriction based on the access control information acquired in advance from the image forming apparatus 102 (YES in step S643), the processing proceeds to step S610.

In step S610, the imposition information analysis unit 414 executes print processing by trusting, as an exception, the imposition information relating to the image based on the "image and the imposition information" included in the print data received by the data receiving unit 412. Thus, in the present exemplary embodiment, for example, by performing the processing of step S643, an example of a determination unit is realized. Further, by performing the processing of step S610, and the related processing of the printer driver 1111 and the image forming apparatus 102, an example of an output unit is realized.

On the other hand, if it is determined that the imposition setting acquired in step S642 does not satisfy the restriction based on the access control information acquired in advance from the image forming apparatus 102 (NO in step S643), the processing proceeds to step S644. In step S644, the printer driver 1111 performs the processing for when printing execution is impossible. An example of the processing for when printing execution is impossible is to display a warning message.

Thus, in the present exemplary embodiment, the printer driver 1111 automatically analyzes the layout of the image sent from the client application 1101, and based on the analyzed result, determines the contents of the imposition information set by the user. Further, based on the access control information, the printer driver 1111 determines whether the contents of the imposition setting determined from the layout of the image are within the restriction imposed on the client application 1101.

If it is determined that the contents of the imposition setting are within the restriction imposed on the client application 1101, the printer driver 1111 performs print processing for printing the one N-in-1 virtually imposed image. Therefore, in addition to the benefits described for the first exemplary embodiment, the additional benefit that, whether printing based on virtual imposition can be executed can be determined on the printer driver 1111 side.

Further, the processing of the flowcharts (FIGS. 6B, 8B, and 12B) relating to the printer drivers 411 and 1111 described in the respective exemplary embodiments can also be performed by the image forming apparatus 102.

In addition, the present invention can also be implemented as a system, an apparatus, a method, a program, or a storage medium, for example. Specifically, the present invention can be applied in a system configured from a plurality of devices, or in an apparatus configured from a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-096209 filed Apr. 10, 2009, which is hereby incorporated by reference herein in its entirety.

What is claimed is:

1. An information processing apparatus for communicating with an image forming apparatus prohibiting 1-in-1 printing which imposes one page on a side of a sheet, the information processing apparatus comprising a processor and a memory, wherein the processor using a printer driver functions as:

a receiving unit of the printer driver configured to receive print data from an application program, wherein the print data is a virtual N-in-1 aggregate image which is generated by the application program (N>1), and wherein the virtual N-in-1 aggregate image is recognized as a 1-in-1 image by the printer driver;

a determination unit of the printer driver configured to determine whether the application program is pre-registered as a predetermined application to which 1-in-1 printing is permitted; and an output control unit of the printer driver configured to execute 1-in-1 printing of the print data received from the application program by the receiving unit if the determination unit determines that the application program is pre-registered as the predetermined application to which 1-in-1 printing is permitted, and to display a warning message if the determination unit determines that the application program is not registered as the predetermined application.

2. The information processing apparatus according to claim 1, wherein the warning message indicates that 1-in-1 printing of the print data received from the application program cannot be executed.

3. The information processing apparatus according to claim 1, wherein the output control unit sends 1-in-1 printing data of the print data with information indicating that 1-in-1 printing is exceptionally permitted, to the image forming apparatus if the determination unit determines that the application program is pre-registered as the predetermined application.

4. A method executed by a printer driver of an information processing apparatus, the method comprising:

receiving print data from an application program, wherein the print data is a virtual N-in-1 aggregate image which is generated by the application program (N>1), and wherein the virtual N-in-1 aggregate image is recognized as a 1-in-1 image by the printer driver;

determining whether the application program is pre-registered as a predetermined application to which 1-in-1 printing is permitted; and executing 1-in-1 printing of the print data received from the application program by the receiving if it is determined that the application program is pre-registered as the predetermined application to which 1-in-1 printing is permitted, and displaying a warning message if it is determined that the application program is not registered as the predetermined application.

5. The method according to claim 4, wherein the warning message indicates that 1-in-1 printing of the print data received from the application program cannot be executed.

6. The method according to claim 4, further comprising sending 1-in-1 printing data of the print data with information indicating that 1-in-1 printing is exceptionally permitted, to an image forming apparatus if it is determined that the application program is pre-registered as the predetermined application.

7. A non-transitory computer readable storage medium storing a printer driver for causing a computer to perform a method comprising:

receiving print data from an application program, wherein the print data is a virtual N-in-1 aggregate image which is generated by the application program (N>1), and wherein the virtual N-in-1 aggregate image is recognized as a 1-in-1 image by the printer driver;

determining whether the application program is pre-registered as a predetermined application to which 1-in-1 printing is permitted; and executing 1-in-1 printing of the print data received from the application program by the receiving if it is determined that the application program is pre-registered as the predetermined application to which 1-in-1 printing is permitted, and displaying a warning message if it is determined that the application program is not registered as the predetermined application.

8. The non-transitory computer readable storage medium according to claim 7, wherein the warning message indicates that 1-in-1 printing of the print data received from the application program cannot be executed.

9. The non-transitory computer readable storage medium according to claim 7, further comprising sending 1-in-1 printing data of the print data with information indicating that 1-in-1 printing is exceptionally permitted, to an image forming apparatus if it is determined that the application program is pre-registered as the predetermined application.

* * * * *